Nov. 22, 1960 W. SMIGO 2,961,122
HANDLE MOUNTING FOR LIQUID VESSEL
Filed Aug. 2, 1957

Inventor:
William Smigo.
by Armand Cifelli
His Attorney

United States Patent Office 2,961,122
Patented Nov. 22, 1960

2,961,122

HANDLE MOUNTING FOR LIQUID VESSEL

William Smigo, Allentown, Pa., assignor to General Electric Company, a corporation of New York Filed Aug. 2, 1957, Ser. No. 675,956

6 Claims. (Cl. 220—94)

This invention relates to handle mountings and particularly to those which are used with liquid vessels.

Handles are used on many devices in practice, and normally serve both aesthetic and utilitarian functions. A very common use of handles is on vessels, particularly vessels wherein liquid may be heated and poured. A good example of this type of vessel is a coffee maker, and it will be readily understood that a handle for such a vessel must: (1) have aesthetic appeal, in that it must blend into the over-all design of the coffee maker, and (2) perform the utilitarian functions of providing an inexpensive, liquid leak-proof, convenient means for lifting the coffee maker. The aesthetic function is accomplished by providing a handle on the vessel in such a manner that the handle mounting means is not visible from the exterior of the vessel, e.g., the bolts or screws utilized to secure the handle to the vessel are concealed. The utilitarian functions are accomplished by providing a water tight connection between the handle and the vessel, and minimizing the cost of manufacturing the entire device by reducing the cost of fabrication and assembly of the parts of the handle mounting.

It is an object of this invention to provide an improved handle mounting, and particularly one which is well suited for mounting a handle on a liquid vessel of the coffee maker variety. It is part of this object to provide a handle mounting which is both: (1) aesthetically appealing, in that none of its mounting means are visible from the exterior of the vessel, and (2) possesses the utilitarian attributes of being secured to the liquid vessel in a water tight manner, and being economical in cost of fabrication and assembly.

The above object is achieved in one form by providing a handle mounting for a liquid vessel wherein the handle includes a plurality of bosses having coupling means; a coupling member is rigidly secured to the vessel and extends away therefrom on the exterior thereof; and a second coupling member is removably mounted within an opening in said vessel and extends away therefrom in spaced relation to the first coupling member; the coupling means on the bosses cooperate with the coupling members in such a manner to mount the handle on the vessel that a cup-shaped ferrule is positioned around each of the bosses and its associated coupling member, and a resilient spacer is positioned within each ferrule and is compressed between it and its associated coupling member and boss.

The above and other objects, and further details of that which I believe to be novel and my invention will be clear from the following description and claims taken with the accompanying drawings wherein:

Figure 1:
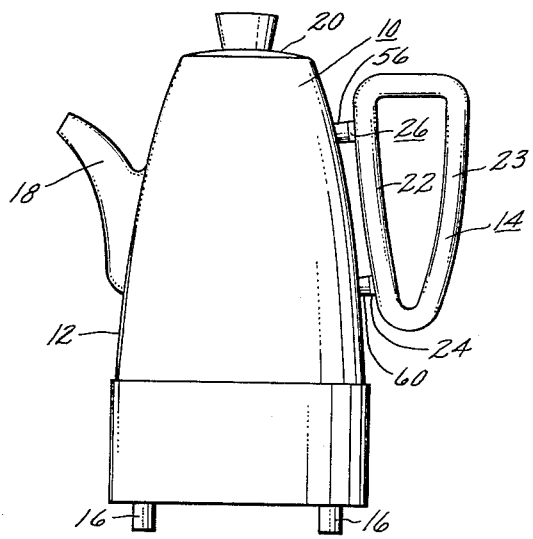
Fig. 1 is an elevation view of a coffee maker including a handle which is mounted in accordance with the principle of the instant invention.

In Fig. 1 there is illustrated a coffee maker 10 which includes liquid vessel 12 and the handle 14, which is secured to said liquid vessel by the improved mounting means contemplated by the instant invention. The specific construction of the coffee maker is not particularly relevant so long as it is understood that the liquid vessel 12 is adapted to house liquid. The coffee maker 10 may be simply a receptacle, such as the decanter of a drip type coffee maker, or include internal coffee maker structure, such as its own heating and control system, and includes the supporting legs 16, the spout 18, and the cap 20.

The handle 14 comprises an elongated, slightly curved, mounting portion 22, a gripping portion 23, and a pair of spaced mounting bosses 24 and 26, both of which extend laterally in the same direction from one side of said mounting portion. The handle 14 may be molded or cast of any desirable material, such as any of the suitable plastic materials which are available, and when used on a coffee maker will preferably be a heat resistant and insulating material. It will be understood that other shaped handles may be used and that the one illustrated is merely exemplary. Regardless of the shape of the handle, it is necessary, however, that a pair of spaced mounting bosses, such as the ones illustrated, be included, for they perform important functions in mounting the handle on a vessel.

Figure 2:
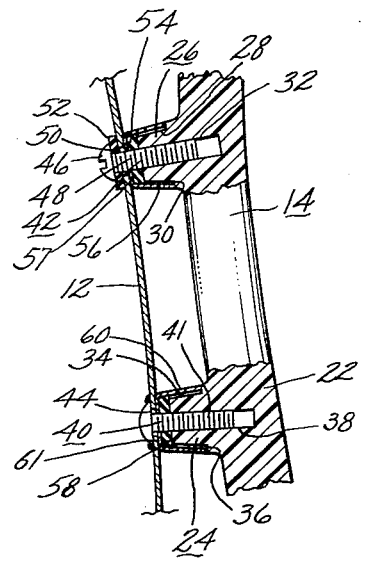
Fig. 2 is a fragmentary sectional view taken substantially in a plane that passes vertically and centrally through the handle, its mounting means, and a portion of the liquid vessel.
Figure 3:
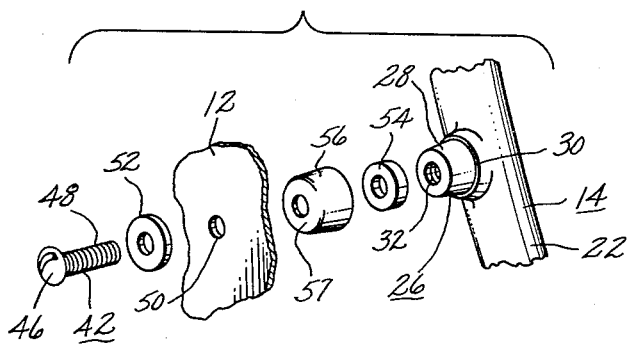
Fig. 3 is a fragmentary exploded view of a portion of the liquid vessel and the mounting means for the upper mounting boss of the handle.

The mounting bosses 24 and 26 are substantially identical in configuration and each comprises a tapered cylindrical portion that includes an internally threaded bore. By reference to Figs. 2 and 3, it will be seen that the mounting boss 26 includes a tapered cylindrical portion having a tapered circumferential external surface 28 that merges at one of its axial ends with an annular shoulder 30, and an internally threaded bore 32. The mounting boss 24 has a similar construction to that of mounting boss 26, and includes tapered, circumferential, external surface 34, annular shoulder 36 and internally threaded bore 38.

The liquid vessel 12 includes means for cooperating with the mounting bosses 24 and 26 of the handle 14 to mount said handle. By reference to Fig. 2 it will be seen that this means comprises a pair of spaced threaded members in the form of the stud 40 and the screw 42. The stud 40 is disposed within the opening 44 formed in the side of the liquid vessel 12 and projects away from said vessel. The stud is rigidly secured to the liquid vessel, as by being welded or brazed to the side of the liquid vessel, so as to become an integral part of the liquid vessel. The connection between the stud and liquid vessel might be effected in other ways, for example, the stud could be mounted completely on the exterior of vessel, if desired; regardless of the precise manner of effecting this connection, it is necessary that the connection be permanent and completely water tight.

On the other hand, the screw 42 is detachably secured to the liquid vessel 12. Screw 42 includes the head 46 which is adapted to receive a screw driver or equivalent implement, and a threaded shaft portion 48, which is removably positioned in the opening 50 in the side of the liquid vessel. A sealing means in the form of a fiber washer 52 or the like is disposed between the head 46 of the screw and the portions of the inner surface of the liquid vessel which surround opening 50 to effect a temporary, substantially water tight, sealed connection between the screw and side of the liquid vessel when the screw is disposed in its final position.

Each mounting boss is adapted to internally receive one of said threaded members. Between each mounting boss and the portion of the vessel which is adjacent to it, there is positioned a resilient annular spacer, and a rigid cup-shaped ferrule is associated with each spacer. In each case, the spacer and ferrule are disposed about their associated threaded member. For example, in Figs. 2 and 3 it will be seen that the resilient annular spacer 54 and the apertured, rigid, cup-shaped ferrule 56 cooperate with the screw 42 and the mounting boss 26. On the other hand, the resilient annular spacer 58 and the apertured, rigid cup-shaped ferrule 60 cooperate with the stud 40 and the mounting boss 24.

A particularly effective way of mounting the handle 14 on the liquid vessel 12 is to start by placing the spacer 58 in the ferrule 60 and then placing both on the threaded shaft portion 41 of the stud 40, and then to screw the internally threaded bore 38 of the mounting boss 24 onto said portion; it should be noted that at this point in assembly these parts are disposed in such a manner that the radial flange-like portion 61 of the ferrule 60 is located adjacent the side of the liquid vessel, and that said ferrule loosely houses the spacer 58 in its cavity and loosely contacts the circumferential surface 34 of mounting boss 24. By cranking the handle 14, the mounting boss 24 may be quickly mounted in place and assume the position substantially shown in Fig. 2. In this position the ferrule 60 firmly contacts the side of the liquid vessel, the circumferential surface 34 and the shoulder 36, and the resilient spacer 58 is compressed within the space formed by the cavity in ferrule 60, the mounting boss 24 and the threaded portion of stud 40.

To secure the mounting boss 26 to the liquid vessel, the spacer 54 is placed within the ferrule 56, and the latter is placed on the mounting boss 26 so as to loosely contact circumferential surface 28. The handle is then moved until the openings in the spacer 54 and the radial, flange-like portion 57 of the ferrule 56 are substantially aligned with the opening 50 in the liquid vessel. The sealing washer 52 is slid onto the threaded shaft portion 48 of the screw 42, the latter is inserted from the interior of the liquid vessel through the opening 50, the openings in the portion 57 of the ferrule 56 and spacer 54, and driven into internally threaded bore 32 of the mounting boss 26 until the ferrule is tightly mounted between the liquid vessel and the shoulder 30 on the mounting boss 26. Of course, a screw driver or the like may be used with head 46 to drive the screw 42 in final position. When in final assembled position, the parts are disposed in a condition similar to those associated with mounting boss 24, i.e., the resilient spacer 54 is compressed within the space formed by the cavity in ferrule 56, mounting boss 26 and threaded portion 48 of screw 42.

It should be noted that the ferrules provided on both the upper and lower mounting bosses are utilitarian as well as decorative. The ferrules when fully mounted present a pleasing appearance, provide reinforcement for the mounting bosses, and house the resilient spacers. On the other hand, the resilient spacers are purely functional in that they allow take-up for variations in the parts, particularly the mounting boss 24 relative to the stud 40, and also in that they set up a series of compressive forces against the ferrules, threaded members, and mounting bosses, which produce a locking effect to maintain a secure mounting once the handle is installed. It should be noted, further, that the sealing washer 52, which is utilized only in the case of the screw 42, provides a seal between said screw and the opening 50 when said screw is tightly mounted in final position.

In view of the foregoing, it is believed to be apparent that a handle mounting has been provided: (1) which is economical to fabricate and assemble, the latter resulting primarily from the simple manner in which the handle may be cranked on the stud, and then the screw driven in final position, (2) wherein the aesthetic attribute of completely hiding all unsightly mounting means from vision is afforded, and (3) wherein a tightly locked, water tight mounting is effected.

As will be evident from the foregoing description, certain aspects of my invention are not limited to the particular details of construction of the example illustrated, and I contemplate that various other modifications and applications will occur to those skilled in the art. It is, therefore, my intention that the appended claims will cover such modifications and applications as do not depart from the true spirit and scope of my invention.

What I claim as new and desire to secure by Letters Patent of the United States is:

1. The combination comprising: a liquid vessel; a handle therefor; and means for mounting said handle on said vessel; said means comprising a plurality of threaded mounting bosses supported by said handle, a plurality of cooperating threaded members supported by said vessel, a plurality of resilient spacers equal in number to the number of said bosses, one of said spacers being positioned between said vessel and each of said bosses, and a plurality of ferrules equal in number to the number of said bosses, one of said ferrules being disposed about each of said spacers, the longitudinal dimension of said ferrules being greater than the corresponding dimension of said spacers, whereby said spacers are compressed and function to lock said handle in mounted position when said bosses and said threaded members cooperate to mount said handle on said vessel, and whereby said ferrules cover said spacers and a portion of said bosses when the handle is mounted on the vessel.

2. A device as defined in claim 1 wherein said threaded members on said vessel comprise a pair of threaded shafts, and said bosses are internally threaded and adapted to receive said shafts.

3. A device as defined in claim 2 wherein one of said shafts is rigidly connected to said vessel in a water tight manner, whereby said handle may be cranked on said one shaft during mounting.

4. A device as defined in claim 3 wherein the other of said shafts comprises a detachable headed threaded member which extends through an opening in said vessel and has its head disposed within said vessel.

5. The combination comprising: a liquid vessel; a handle; a threaded stud rigidly connected to said vessel; an opening in said vessel spaced from said stud; a pair of spaced internally threaded mounting bosses supported by said handle; one of said bosses being adapted to be cranked on said stud, a resilient annular spacer mounted on said stud and positioned between said one boss and said vessel whereby said spacer is compressed when said one boss is fully mounted on said stud and thereby locks the mounting of said one boss; a detachable headed threaded member adapted to extend through said opening with its head within said vessel and cooperate with the other boss to connect the latter to said vessel and thereby complete the mounting of said handle; a ferrule disposed about said stud, said spacer and said one boss; the longitudinal dimension of said ferrule being greater than the corresponding dimension of said spacer, whereby said spacer when fully mounted exerts a force on each of said stud, said ferrule and said one boss to lock the mounting of said one boss on said stud and whereby said ferrule completely covers said spacer.

6. A device as defined in claim 5 wherein a second resilient annular spacer and a second ferrule are operatively associated with said headed threaded member and said other boss in the same manner as said spacer, said ferrule and said one boss are associated; and means is provided for sealing the connection between said opening and said head.

References Cited in the file of this patent

UNITED STATES PATENTS

| | | |
|---|---|---|
| 609,431 | Harper | Aug. 23, 1898 |
| 1,371,001 | Schmidt | Mar. 8, 1921 |
| 1,975,241 | Werber et al. | Oct. 2, 1934 |
| 2,171,322 | Rivard | Aug. 29, 1939 |